(12) United States Patent
Corbin et al.

(10) Patent No.: US 8,188,205 B2
(45) Date of Patent: May 29, 2012

(54) HYDROTALCITE CATALYZED POLYMERIZATION OF TRIMETHYLENE CARBONATE

(75) Inventors: David Richard Corbin, West Chester, PA (US); Robert DiCosimo, Chadds Ford, PA (US); Neville Everton Drysdale, Newark, DE (US); Hari Babu Sunkara, Hockessin, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 190 days.

(21) Appl. No.: 12/277,667

(22) Filed: Nov. 25, 2008

(65) Prior Publication Data
US 2009/0143563 A1 Jun. 4, 2009

Related U.S. Application Data

(60) Provisional application No. 60/991,698, filed on Nov. 30, 2007.

(51) Int. Cl.
*C08F 18/24* (2006.01)

(52) U.S. Cl. ........ 526/314; 526/173; 526/181; 526/269; 526/270; 528/413

(58) Field of Classification Search .................. 526/314, 526/173, 181, 269, 270; 528/413
See application file for complete search history.

(56) References Cited

U.S. PATENT DOCUMENTS

| 5,721,305 | A | 2/1998 | Eshuis et al. |
| 6,451,949 | B2 * | 9/2002 | Boon et al. ..................... 526/314 |
| 2004/0141907 | A1 * | 7/2004 | Eisgruber et al. .......... 423/420.2 |

FOREIGN PATENT DOCUMENTS

| EP | 0600417 A | 6/1994 |
| WO | 0164771 A | 9/2001 |

OTHER PUBLICATIONS

Albertsson (J.M.S.-Pure Appl. Chem., A29 (1), pp. 43-54 (1992)).*
H. Hyun et al., J. Polym. Sci. Part A: Poly. Chem., 2006, vol. 44.
Y. Shibasaki et al., Activated Monomer Cationic Polymerization of 1,3-Dioxepan-2-One Initiated by Water-Hydrogen Chloride, Macromol. Rapid Commun., 1999, vol. 20:532-535.
Y. Shibasaki et al., Activated Monomer Cationic Polymerization of Lactones and the Application to Well-Defined Block Copolymer Synthesis With Seven-Membered Cyclic Carbonate, Macromolecules, 2000, vol. 33:4316-4320.
F. Cavani et al., Hydrotalcite-Type Anionic Clays: Preparation, Properties and Applications, Catalysis Today, 1991, vol. 11:173-301.
W. T. Reichle, Anionic Clay Minerals, Chemtech, vol. 16, No. 1, 1986, pp. 58-63.
F. Lei et al., Applications of Layered Double Hydroxides, Struct Bond, vol. 119, 2006, pp. 193-223.
B. F. Sels et al., Hydrotalcite-Like Anionic Clays in Catalytic Organic Reactions, Catalysis Reviews, vol. 43, No. 4, 2001, pp. 443-488.
International Search Report, PCT International Application PCT/US2008/084713, Jun. 11, 2009.

* cited by examiner

*Primary Examiner* — Randy Gulakowski
*Assistant Examiner* — Shane Fang

(57) ABSTRACT

The present invention relates to the use of hydrotalcites as catalysts for the polymerization of unsubstituted or substituted trimethylene carbonate.

4 Claims, No Drawings

HYDROTALCITE CATALYZED POLYMERIZATION OF TRIMETHYLENE CARBONATE

FIELD OF THE INVENTION

The present invention relates to the use of hydrotalcites as catalysts for the polymerization of unsubstituted or substituted trimethylene carbonates.

BACKGROUND

Poly(trimethylene carbonate)glycols find use in a variety of materials. These diols have been prepared by the polymerization of trimethylene carbonate (TMC, 1,3-dioxan-2-one), generally using catalysts containing organometallic compounds such as zinc, tin and alkali metal compounds, as described in Hyun, H.; et. al. J. Polym. Sci. Part A: Polym. Chem.: Vol. 44 (2006). Also, it has been reported that TMC can be polymerized via various alcohol and HCl initiator systems, as described in Shibasaki, Y.; et al., Macromol. Rapid Commun. 20, 532 (1999) and Macromolecules 2000, 33, 4316. These methods necessitate the removal of the catalyst used, especially when the resulting diols are to be used in biomedical applications. Hydrotalcites can act as heterogeneous catalysts for polymerization reactions (see, for example, F. Cavani, et al., Catalysis today, 11 (1991) 173-301).

There exists a need to produce catalyst-free poly(1,3-propanediol carbonate)diol oligomers via polymerization of trimethylene carbonate (TMC, 1,3-dioxan-2-one).

SUMMARY OF THE INVENTION

One aspect of the present invention is a process for producing unsubstituted or R-substituted poly(trimethylene carbonate)glycols, comprising contacting unsubstituted or R-substituted trimethylene carbonate with a hydrotalcite catalyst in the presence of one or more solvents at a temperature of about 40 to about 120 degrees Celsius, to form a reaction mixture, the reaction mixture comprising unsubstituted or R-substituted poly(1,3-propanediol carbonate)diol oligomers.

DETAILED DESCRIPTION

The present invention relates to a process to make unsubstituted or R-substituted poly(trimethylene carbonate)glycols from trimethylene carbonate (TMC, 1,3-dioxan-2-one) at elevated temperatures (generally between about 40 and 120 degrees Celsius) in the presence of a solvent utilizing a hydrotalcite as a catalyst. This reaction can be represented by the equation below:

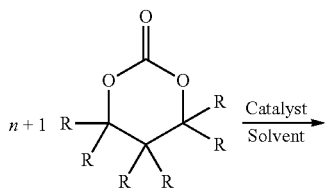

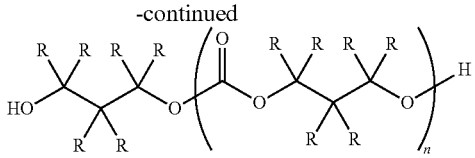

The unsubstituted trimethylene carbonate can be derived from 1,3-propanediol, which is also known as PO3G, and available from DuPont, Wilmington, Del.

In the structure above, each R substituent is independently selected from the group consisting of H, $C_1$-$C_{20}$ alkyl, particularly $C_1$-$C_6$ alkyl, $C_3$-$C_{20}$ cyclic alkyl, $C_3$-$C_6$ cyclic alkyl, $C_5$-$C_{25}$ aryl, particularly $C_5$-$C_{11}$ aryl, $C_6$-$C_{20}$ alkaryl, particularly $C_6$-$C_{11}$ alkaryl, and $C_6$-$C_{20}$ arylalkyl, particularly $C_6$-$C_{11}$ arylalkyl, and each R substituent can optionally form a cyclic structural group with adjacent R substituents. Typically such cyclic structural groups are $C_3$-$C_8$ cyclic groups, e.g., cyclopropane, cyclobutane, cyclopentane, cyclohexane, cycloheptane, and cyclooctane. In the structure above, n is an integer of about 2 to 100, and particularly about 2 to 50; and z is an integer of about 1 to about 20, particularly about 1 to 7, more particularly about 1 to 5.

The unsubstituted or substituted poly(trimethylene carbonate)glycols can be isolated using known methods.

Trimethylene carbonate (TMC) is prepared by any of the various chemical or biochemical methods known to those skilled in the art. Chemical methods for the preparation of TMC include, but are not limited to, a) reacting 1,3-propanediol with diethylcarbonate in the presence of zinc powder, zinc oxide, tin powder, tin halide or an organotin compound at elevated temperature, b) reacting 1,3-propanediol and phosgene or bis-chloroformates to produce a polycarbonate intermediate that is subsequently depolymerized using heat and, optionally, a catalyst, c) depolymerizing poly(trimethylene carbonate) in a wiped film evaporator under vacuum, d) reacting 1,3-propanediol and urea in the presence of metal oxides, e) dropwise addition of triethylamine to a solution of 1,3-propanediol and ethylchloroformate in THF, and f) reacting 1,3-propanediol and phosgene or diethylcarbonate. Biochemical methods for the preparation of TMC include, but are not limited to, a) lipase catalyzed condensation of diethylcarbonate or dimethylcarbonate with 1,3-propanediol in an organic solvent, and b) lipase-catalyzed depolymerization of poly(trimethylene carbonate) to produce TMC. The 1,3-propanediol and/or trimethylene carbonate (TMC) can be obtained biochemically from a renewable source ("biologically-derived" 1,3-propanediol).

Preferably the 1,3-propanediol used as the reactant or as a component of the reactant has a purity of greater than about 99%, and more preferably greater than about 99.9%, by weight as determined by gas chromatographic analysis The purified 1,3-propanediol preferably has the following characteristics:

(1) an ultraviolet absorption at 220 nm of less than about 0.200, and at 250 nm of less than about 0.075, and at 275 nm of less than about 0.075; and/or
(2) a composition having CIELAB "b*" color value of less than about 0.15 (ASTM D6290), and an absorbance at 270 nm of less than about 0.075; and/or
(3) a peroxide composition of less than about 10 ppm; and/or
(4) a concentration of total organic impurities (organic compounds other than 1,3-propanediol) of less than about 400 ppm, more preferably less than about 300 ppm, and still more preferably less than about 150 ppm, as measured by gas chromatography.

The process employs one or more hydrotalcite(s) as a catalyst. These materials are available from a number of sources. These catalysts are generally added to the reactants to form a reaction mixture. As shown in the examples below, conveniently small amounts of these catalysts afford high conversion rates (approaching 100 percent) within about 25 hours.

Examples of suitable hydrotalcites include Pural® MG materials, available from Sasol, Lake Charles, La. Generally, these hydrotalcites are of the formula $Mg_{2x}Al_2(OH)_{4x+4}CO_3 \cdot nH_2O$ wherein n represents the number of water molecules associated with the magnesium aluminum compound, and is typically an integer of 1 to 4. In the compound as purchased and used in the Examples herein, n is 4.

The process of the present invention employs one or more solvents. Generally, any solvent can be used, as long as it is substantially non-reactive with the reactants and/or catalyst so that unwanted materials are not formed. Examples of solvents useful in the process described herein include but are not limited to methylene chloride, toluene and dioxane. As shown in the examples below, lower amounts of solvent generally provide for higher conversion rates.

The process described herein is carried out at elevated temperature, generally about 40 to 120 degrees Celsius. Once the reactants are added together, they may be mixed by any convenient method. The process can be done in batch, semi-batch or continuous mode, and generally take place in an inert atmosphere (i.e., under nitrogen).

Once the reactants have been contacted with the catalyst in the presence of one or more solvents, the reaction is allowed to continue for the desired time. Generally, at least 6 percent of the TMC polymerizes to give the desired poly(1,3-propanediol carbonate)diol oligomers after about 6 hours, with greater than about 75 percent conversion achieved within about 25 hours. As shown in the examples below, 100 percent conversion can be achieved by the proper selection of solvent and catalyst, and amounts thereof.

Additionally, the desired degree of polymerization, n, can be achieved by selection of solvent and catalyst, and amounts thereof. As shown in the examples below, the use of toluene and hydrotalcites afford a diol oligomer with an n of approximately 6 to about 20.

The resulting poly(1,3-propanediol carbonate)diol oligomers can be separated from the unreacted starting materials and catalyst by any convenient means, such as filtration, including filtration after concentration.

The process presented in the invention allows for the degree of polymerization to be selected based on the solvent and/or catalyst chosen, and the amount of those materials used. This is advantageous as the materials resulting from the process can vary in properties including viscosity. The diol oligomers, particularly poly(1,3-propanediol carbonate)n' diol oligomers with n' less than or equal to 20, can find wide uses in products such as biomaterials, engineered polymers, personal care materials, coatings, lubricants and polycarbonate/polyurethanes (TPUs).

EXAMPLES

Example 1

Trimethylene carbonate (10.00 g, 0.098 mol) and toluene (25 mL) were placed in four round bottom flasks equipped with stirrers, reflux condensers and under nitrogen. To each respective flask was added 1.00 g of Hydrotalcite Pural® MG30, Pural® MG50, Pural® MG70 and Pural® MG61 HT.

The flasks were placed in oil baths maintained at 100° C. and stirred. Aliquots were withdrawn periodically, concentrated at reduced pressure and analyzed via Proton NMR. The table below tabulates the results:

| Example | Hydrotalcite (1.0 g) | Conversion (5 Hr) (%) | Conversion (22 Hr) (%) | n (22 Hr) |
|---|---|---|---|---|
| 1A | Pural® MG30 | 84.63 | 97.97 | 14.20 |
| 1B | Pural® MG50 | 60.64 | 95.43 | 13.39 |
| 1C | Pural® MG70 | 97.72 | 98.72 | 12.37 |
| 1D | Pural® MG61HT | 50.10 | 96.42 | 19.46 |

Example 2

Concentration Effect

Trimethylene carbonate (10.00 g 0.098 mol) and Hydrotalcite Pural® MG70 (1.0 g) were placed in three oven dried flasks equipped with a stirrer, reflux condenser and under nitrogen. Toluene (25, 50 and 100 mL) was added separately to each flask. The flasks were placed and stirred in oil baths maintained at ~100° C. Aliquots were withdrawn periodically, concentrated at reduced pressure and analyzed via Proton NMR. The table below tabulates the results:

| Example | Toluene (mL) | Conversion (3 Hr) (%) | Conversion (5 Hr) (%) | Conversion (22 Hr) (%) |
|---|---|---|---|---|
| 2A | 25 | 88.01 | 97.65 | 97.69 |
| 2B | 50 | 73.17 | 95.96 | 97.80 |
| 2C | 100 | 46.24 | 49.11 | 96.77 |

Example 3

Lower Temperature

Trimethylene carbonate (10.00 g, 0.098 mol) and toluene (25 mL) were placed in three RB flasks equipped with stirrers, reflux condensers and under nitrogen. To each repective flask was added Hydrotalcite Pural® MG70 (2.00, 3.00 and 4.00 g). The flasks were placed in oil baths maintained at 50° C. and stirred. Aliquots were withdrawn periodically, concentrated at reduced pressure and analyzed via Proton NMR. The table below tabulates the results:

| Example | Hydrotalcite Pural® MG70 (g) | Conversion (3 Hr) (%) | n (3 Hr) | Conversion (22 Hr) (%) | n (22 Hr) |
|---|---|---|---|---|---|
| 3A | 2.00 | 98.99 | 9.44 | 98.69 | 7.02 |
| 3B | 3.00 | 96.29 | 7.84 | 98.40 | 6.88 |
| 3C | 4.00 | 197.44 | 7.03 | 98.93 | 6.32 |

What is claimed is:
1. A process for producing unsubstituted or R-substituted poly(trimethylene carbonate)glycols, comprising contacting unsubstituted or R-substituted trimethylene carbonate with a catalyst in the presence of one or more solvents at a tempera- ture of about 40 to about 120 degrees Celsius, to form a reaction mixture, the reaction mixture comprising unsubstituted or R-substituted poly(1,3-propanediol carbonate)diol oligomers, wherein
  the catalyst consists essentially of a hydrotalcite catalyst; and
  the reaction is represented by the equation;

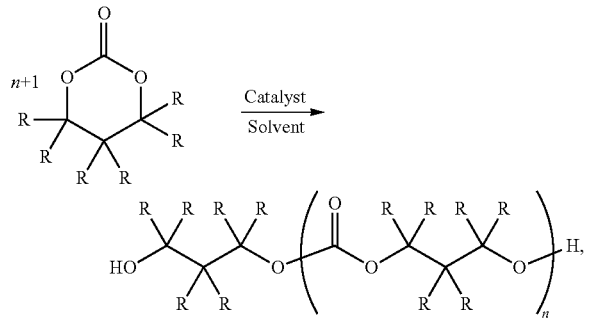

wherein n=2-100; R is substituent independently selected from the group consisting of H, $C_1$-$C_{20}$ alkyl, $C_3$-$C_{20}$ cyclic alkyl, $C_5$-$C_{25}$ aryl, $C_6$-$C_{20}$ alkaryl, and $C_6$-$C_{20}$ arylalkyl, and each R substituent can optionally form a cyclic structural group with adjacent R substituents; the hydrotalcite catalyst is of formula $Mg_{2x}Al_2(OH)_{4x+4}CO_3 \cdot nH_2O$, wherein n represents the number of water molecules associated with the magnesium aluminum compound an integer of 1 to 4 and x=3.

2. The process of claim 1, wherein the solvent is substantially non-reactive.

3. The process of claim 2, wherein the substantially non-reactive solvent is toluene.

4. The process of claim 1, further comprising isolating the unsubstituted or R-substituted poly(trimethylene carbonate) glycols.

* * * * *